May 16, 1950  J. W. FORSYTHE ET AL  2,507,775
APPARATUS FOR THAWING MATERIALS
Original Filed Jan. 24, 1945  8 Sheets-Sheet 3
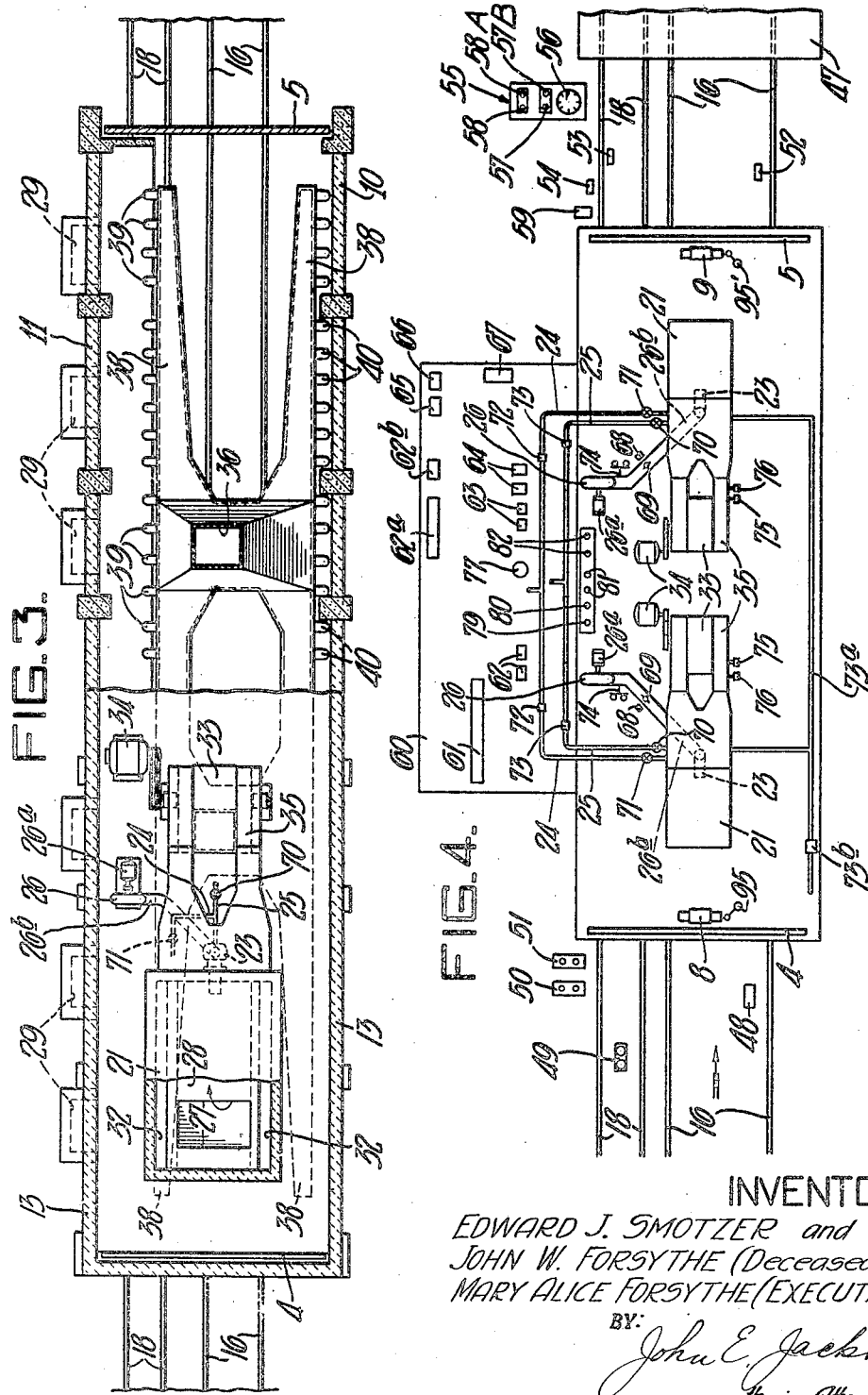
INVENTORS:
EDWARD J. SMOTZER and
JOHN W. FORSYTHE (Deceased)
MARY ALICE FORSYTHE (EXECUTRIX),
BY: John E. Jackson
their Attorney.

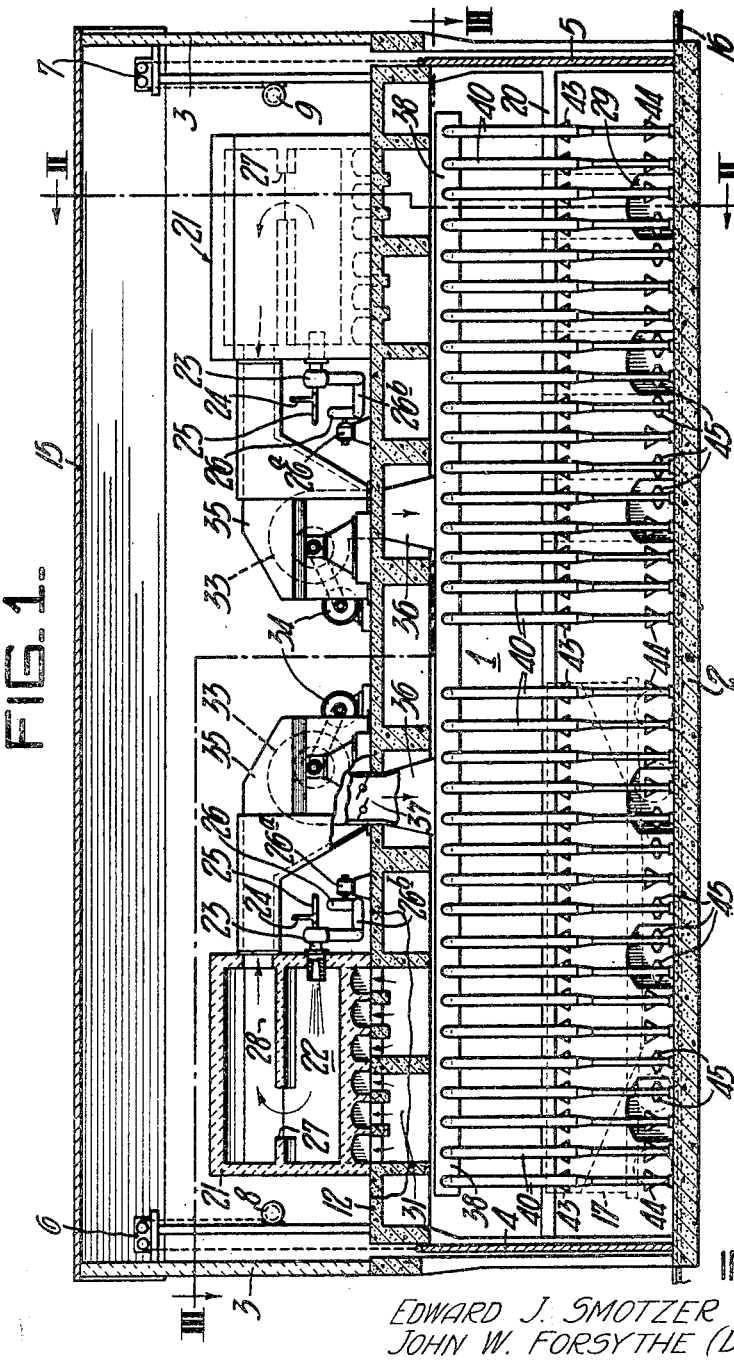

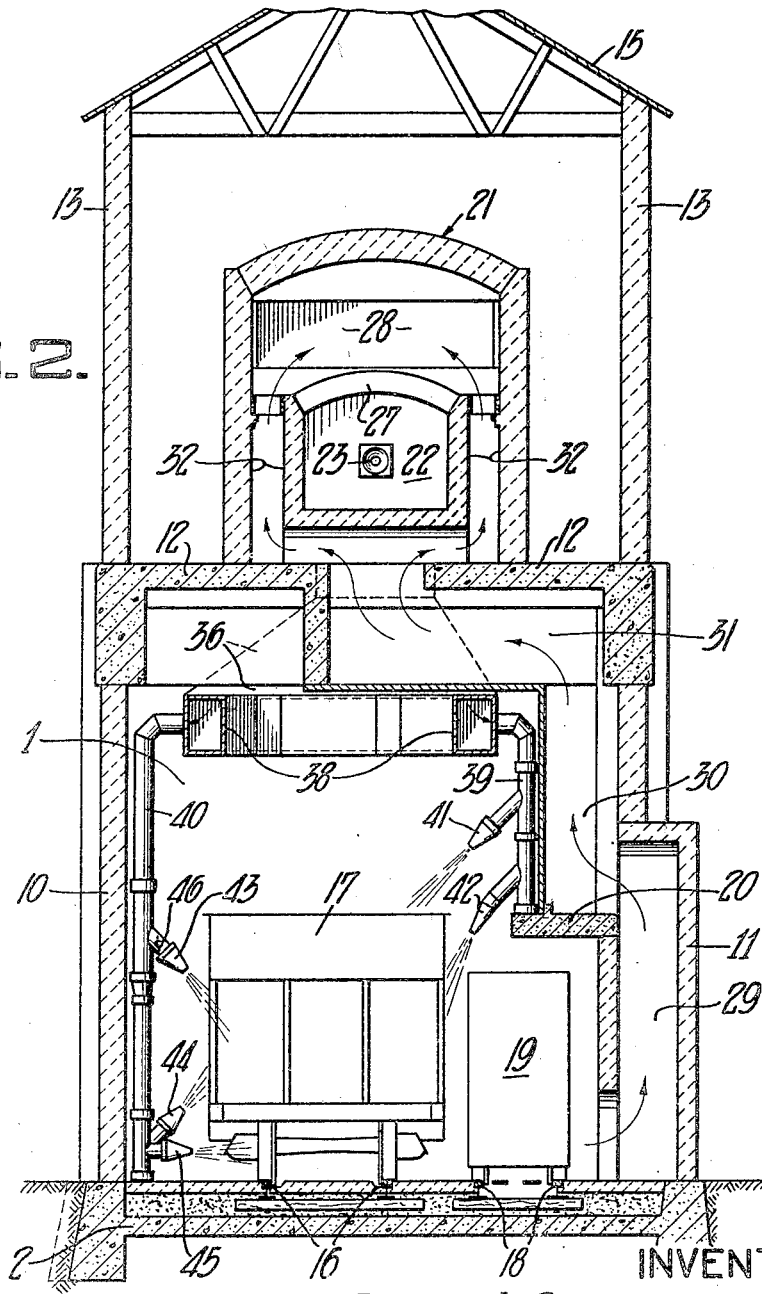

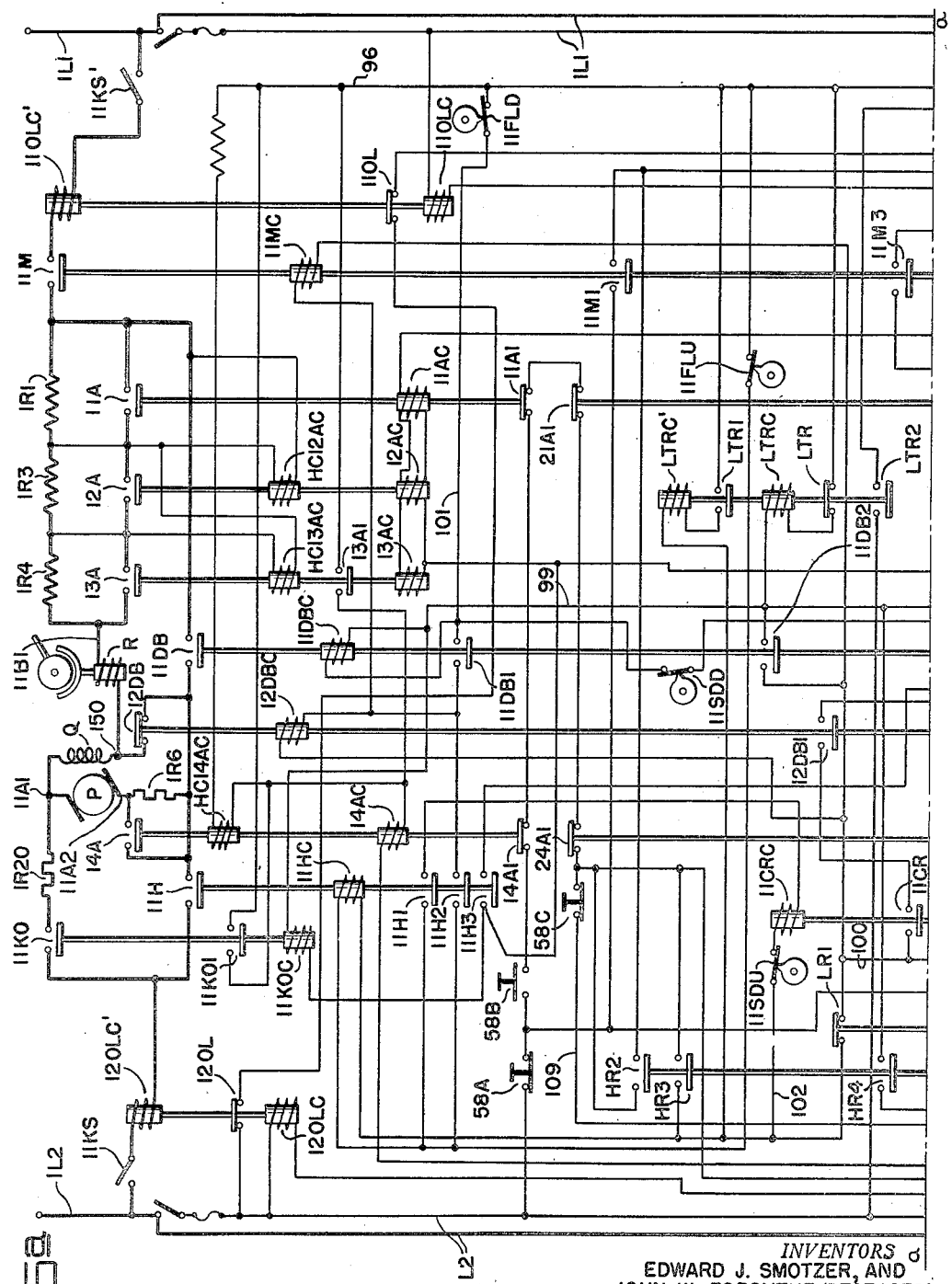

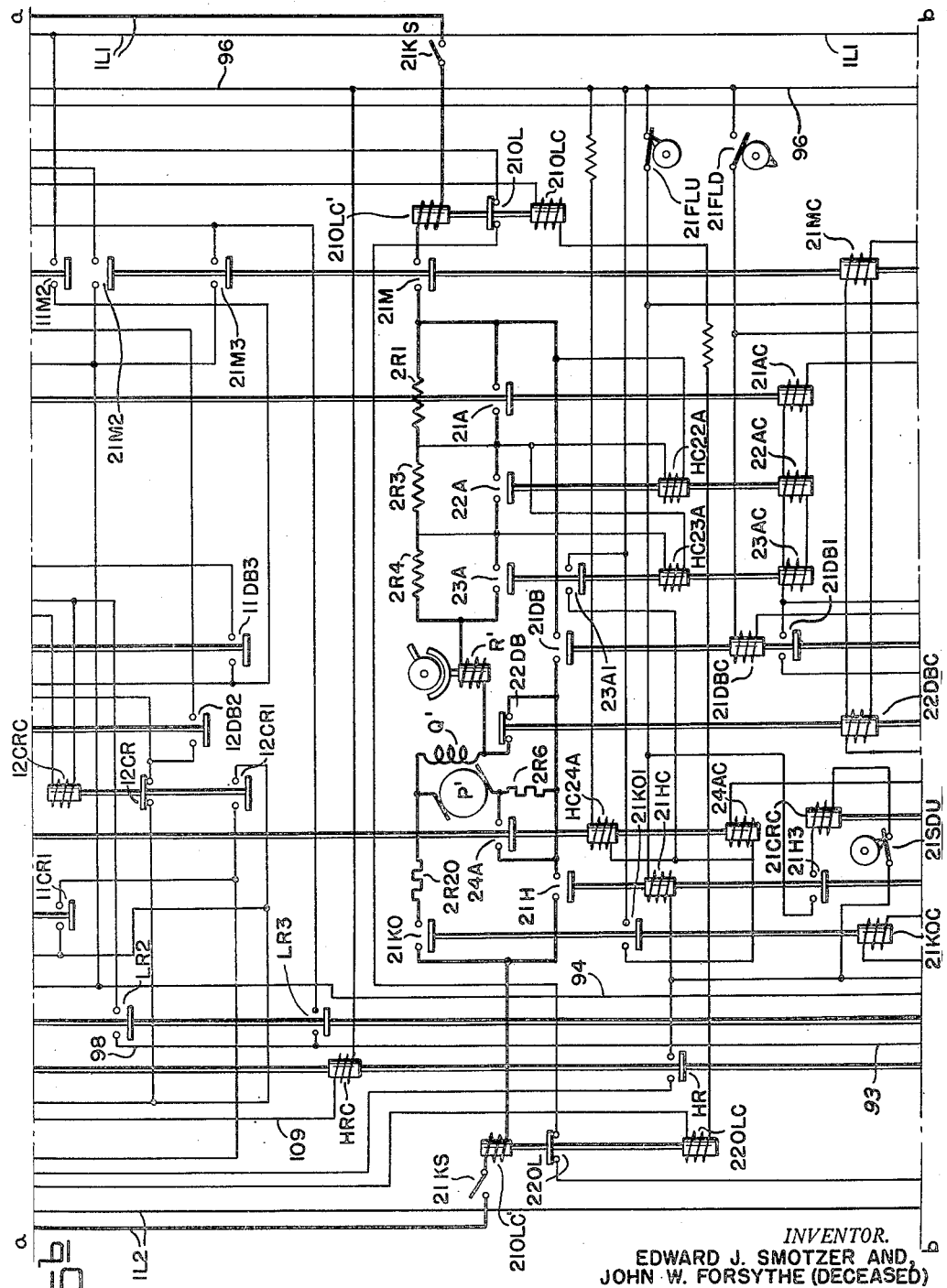

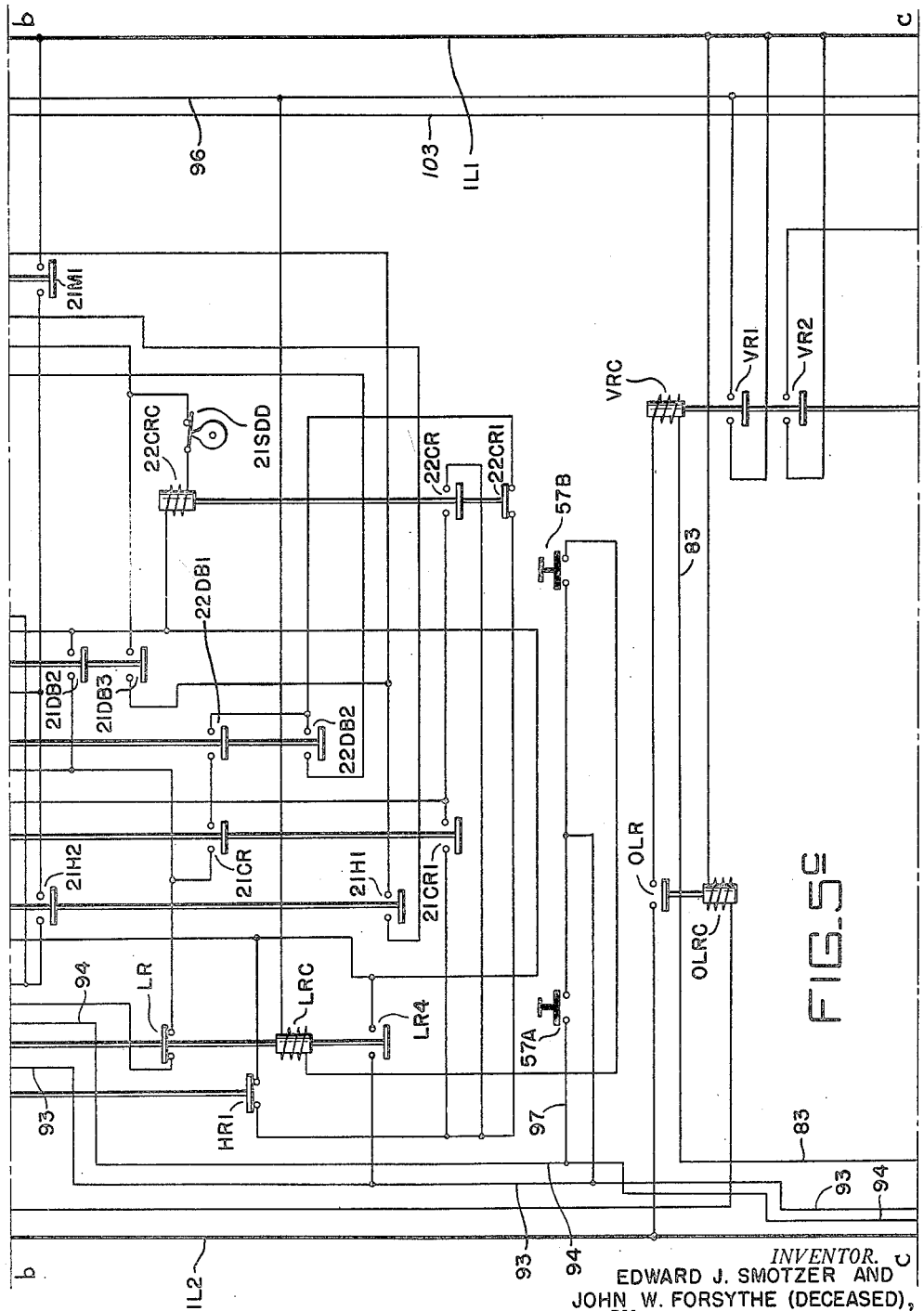

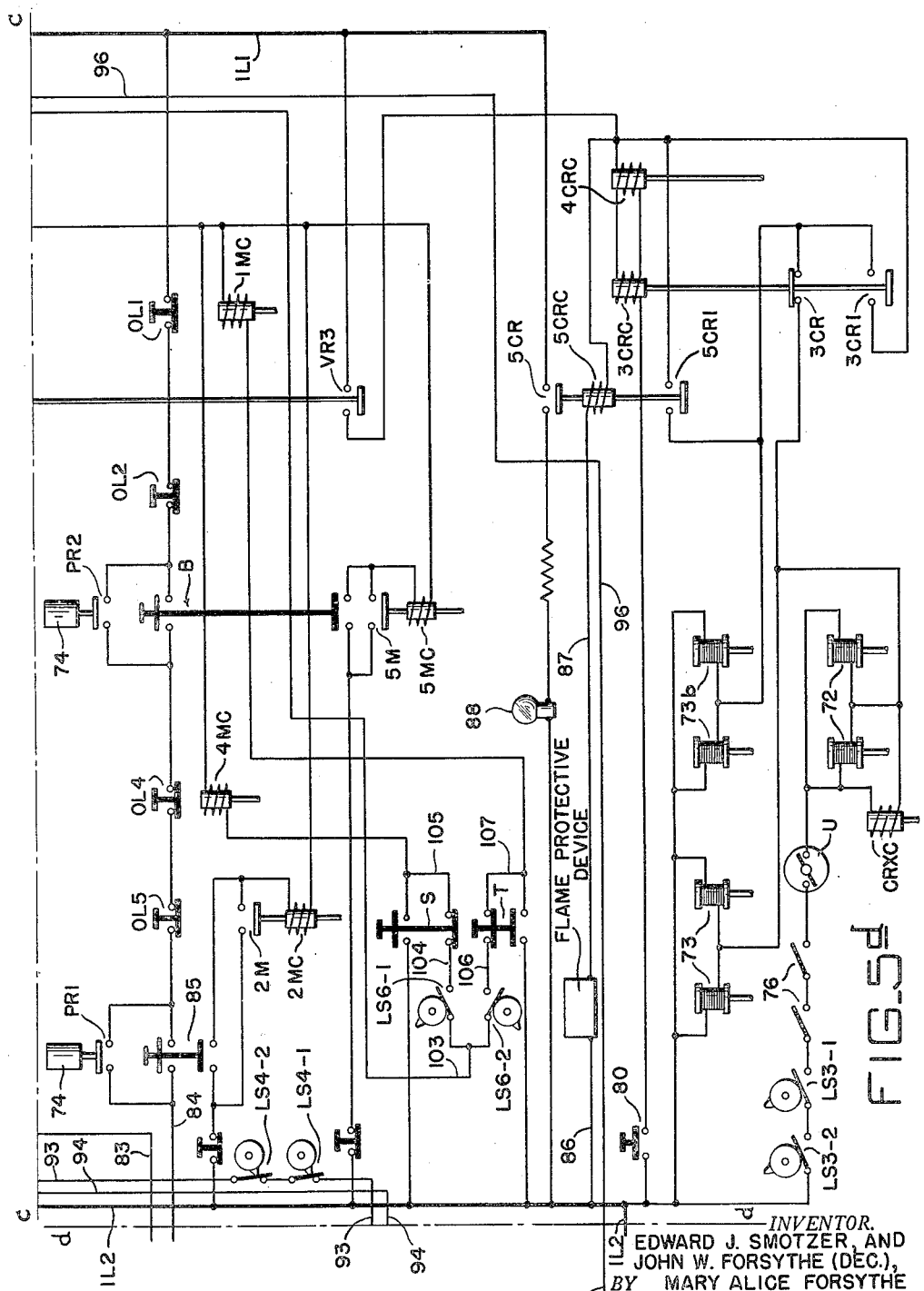

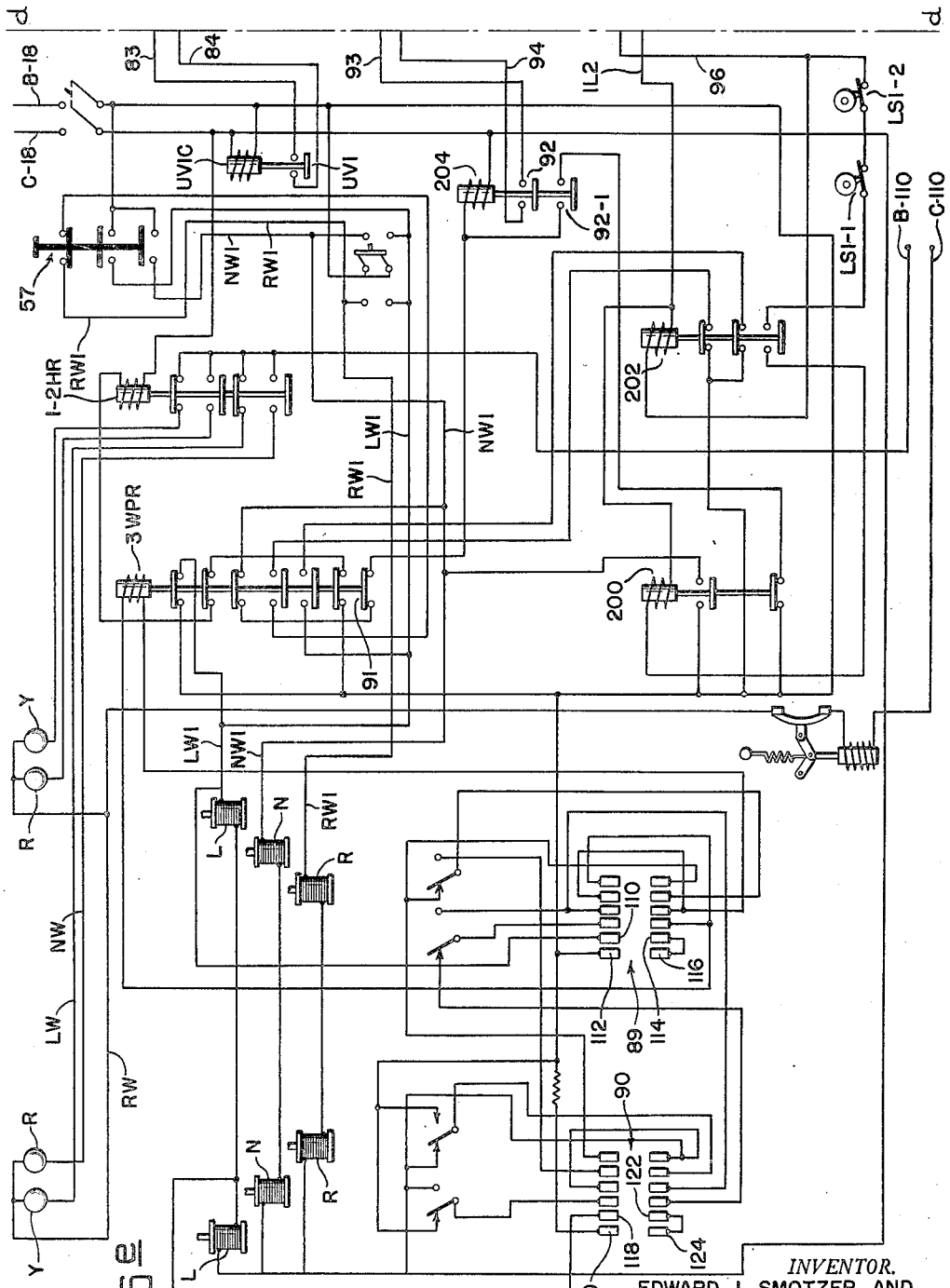

Patented May 16, 1950

2,507,775

UNITED STATES PATENT OFFICE 2,507,775

APPARATUS FOR THAWING MATERIALS

John W. Forsythe, deceased, late of Wilkinsburg, Pa., by Mary Alice Forsythe, executrix, Wilkinsburg, and Edward J. Smotzer, Pittsburgh, Pa., assignors to Carnegie-Illinois Steel Corporation, a corporation of New Jersey Original application January 24, 1945, Serial No. 574,436. Divided and this application August 8, 1945, Serial No. 609,639

4 Claims. (Cl. 104—1)

This invention relates to an apparatus for heating materials; more particularly it relates to an apparatus for thawing materials in containers such as cars and the like.

One of the objects of the invention is the provision of apparatus for thawing in a rapid economical manner frozen materials in containers to allow their ready discharge therefrom.

This and further objects of the invention will become apparent as the description proceeds.

Materials such as ore, limestone, coke, and coal, as well as other similar materials produced or occurring in broken or granular form are transported most economically in open railroad cars and the like from which they are discharged at the point of use or storage, either from bottom openings in the cars or by means of car dumpers which invert the entire car. Such discharge of materials is rendered difficult in cold weather by reason of freezing of the materials in the cars in transit or while standing in the yard due to rain, snow, and ice falling on them. The problem of discharge of the cars is most serious where the material is shipped from lake ports where it is subjected to the damp atmosphere prevailing in such localities.

Various expedients have been tried in the past to thaw and loosen the frozen materials in the cars sufficiently to permit their ready discharge therefrom. Such methods have included the building of wood fires under the cars, the holding of gas jets against the sides of the cars in various places, and the use of steam baths to which parts of the car or the whole car have been subjected. The first two methods are obviously crude and hit-or-miss. Besides requiring a considerable amount of time, they are further open to the very serious objection that they subject portions of the car to sufficiently high temperatures to damage the paint thereon, and even to buckle and otherwise seriously weaken the sides and frames of the cars. Steam baths are also slow and do not in the main impart sufficient heat to the car and its contents to insure thorough thawing of the material. Furthermore, because of the moisture contained in the steam, icing of the apparatus at the thawing station, particularly in very cold weather, inevitably results.

By use of the apparatus of the present invention, the difficulties above outlined attendant upon the use of prior thawing methods are overcome. Briefly, the invention provides means for completely enclosing one or more material carrying devices, such as railroad cars, and for subjecting such cars in the initial portion of the heating cycle to a moderately high temperature which may be, for example, on the order of 750° F., following which the heat is cut back and the car and its contents allowed to soak in the latter part of the cycle at a lower temperature, which may be, for example, on the order of 250° F. The method of heating disclosed herein is claimed in application Serial No. 574,436, filed January 24, 1945, now Patent No. 2,449,932, dated September 21, 1948. This application is a division of said application Serial No. 574,436. Upon completion of the thawing cycle, the container, which may be, for example, a railroad car, is transferred to the discharge station, which may be a car dumper, whereupon additional cars are charged into the thawing chamber or enclosure and the thawing cycle repeated. In the preferred embodiment of the apparatus described in the following disclosure for purposes of illustration, the operation of the heating means and of various protective devices are made automatically responsive to the travel of the thawing chamber closure means whereby a minimum of manual control is required of the operator.

The invention will be more fully understood by reference to the accompanying drawings, in which:

Figure 1 is a side elevation, partially in section, of the thawing chamber;

Figure 2 is a view in cross section of the thawing chamber taken along the line II—II of Figure 1;

Figure 3 is a view in cross section taken along the line III—III of Figure 1;

Figure 4 is a schematic plan view of the apparatus including the thawing chamber, tracks leading thereto, safety devices controlling traffic to and from the thawing chamber, and control devices for the chamber; and Figures 5$^a$, 5$^b$, 5$^c$, 5$^d$ and 5$^e$ are related schematic views of the main electrical circuit and the derailer and light circuits employed in connection with the thawing chamber of the illustrated embodiment of the present invention.

The thawing building shown in Figures 1, 2, and 3, which may be of brick or other heat-resistant material, is designated generally by the reference character 1. Building 1 consists of a foundation 2, the upper surface of which lies at ground level. The building is provided with ends 3 closing the upper portions thereof, and with two doors 4 and 5, door 4 to the left of Figure 1 being sometimes referred to as door #1, and door 5 to the right in Figure 1 being sometimes referred to as door #2. The doors are each provided with a hoisting mechanism, whereby they are lifted sufficiently to allow railroad cars to enter and leave the chamber, the hoisting mechanism for door 4 comprising top sheaves 6 and lower and hoisting drum 8, the corresponding parts of a similar hoisting mechanism for door 5 being designated 7 and 9, respectively. The motor for each door hoist is provided with a traveling nut type limit switch (see Figure 4), that for door 4 (door #1) being designated 95, and that for door 5 (door #2) being designated 95'.

The lower portion of the thawing building is completed by side walls 10 and 11 and by ceiling 12 which forms a floor for the upper portion of the structure. The upper portion of the structure 1, which houses the gas heating and circulating means subsequently to be described, is provided with sides 13 and roof 15, as shown in Figures 1 and 2.

The lower or thawing chamber of the structure is made wide enough, in the particular embodiment shown, to receive a standard railroad car 17, on tracks 16, and a narrow gauge electric pusher locomotive 19, on tracks 18, side by side. Locomotive 19 is provided with a retractible side pusher arm (not shown) which may be advanced to engage the rear of the car to be moved. Such design has been found to lend flexibility to the layout, since the narrow gauge locomotive is not impeded in its travel by the railroad cars, but may proceed to pick up as many or as few cars as are desired. In addition, the space above the narrow gauge track is useful as a walkway when the locomotive is removed and the thawing apparatus is not in use. It is to be understood, however, that other means for moving the cars into and through the thawing device may be employed if desired. Locomotive 19, which is of less height than the cars 17, runs under overhanging portion 20 of the chamber, which forms a portion of the return air flue, which will be subsequently described.

The heating of the air by which thawing of the material is accomplished is performed by two similar heating devices 21, located on the floor of the upper portion of the structure. The left-hand heating device 21 in Figure 1 will sometimes be referred to as unit No. 1, and the right-hand device will be referred to as unit No. 2. Each such heating device 21 comprises a combustion chamber 22, into which is directed the flame from oil burner 23. Such burner is provided, as shown in Figures 1 and 4, with an oil supply pipe 24, a steam pipe 25 for supplying steam for atomizing the oil, and a combustion air blower 26 driven by motor 26ª for delivering air to the burner through delivery pipe 26ᵇ. The products of combustion travel longitudinally of combustion chamber 22 upwardly through opening 27 in the rear thereof into mixing chamber 28 where they are intimately admixed with recirculated air from the lower thawing chamber of the apparatus. Such recirculated air travels upwardly from the thawing chamber through uptakes or flues 29 (see Figure 2), laterally into passage 30, upwardly and then laterally through passages 31 and then upwardly through passages 32, from which it emerges into the mixing chamber.

Circulating air fan 33, driven by motor 34, draws the mixture of recirculated air and products of combustion from mixing chamber 28 into the housing 35 in which the fan is located, and then discharges it under pressure into discharge duct 36. Each fan 33 is provided with a damper 37 in the discharge pipe thereof, whereby, in the event of failure of one heating device 21 or of any of its attendant parts it may be closed off from duct 36 and the entire heating burden borne by the other heating device.

Discharge ducts 36 are connected to ducts 38, which extend longitudinally of the ceiling of the thawing device, as shown in Figures 1, 2, and 3. Vertical discharge pipes 39 and 40, pipes 39 being on the right-hand side of Figure 2 and pipes 40 being on the left-hand side, are connected to longitudinal ducts 38 at substantially uniform spaced points. The thawing chamber shown is designed to take two standard ninety-ton ore cars coupled end to end. It is for this reason that there is a slightly greater space between the adjacent vertical pipes at the longitudinal center of the chamber, that is, the position of the coupling between cars, than between those elsewhere. Pipes 39, which run only to the top of overhang 20, are each provided with an upper nozzle 41 and a lower nozzle 42, discharging the heated air to the contents of the car, and down the side of the car, respectively. Pipes 40 are provided with upper nozzles 43, which discharge the heated air against the other side of the car. Each pipe 40 is also provided with lower nozzles, alternate pipes having lower nozzles 45 which discharge the heated gas horizontally under the car, and the other pipes 40 having lower nozzles 44 which discharge the gas upwardly at an angle against the side of the car. Each nozzle is provided with its own independent damper 46, of which one is shown in Figure 2 in conjunction with nozzle 43, to control the delivery of gas therefrom, and each nozzle is preferably made of a fish tail shape to provide a heated gas jet having a broad coverage over the surface of the car and its contents.

The thawing chamber shown in Figures 1, 2, and 3, and above described, is shown schematically in Figure 4 in operative relationship to other mechanism with which it may be employed. As shown, it may be positioned to span the broad gauge tracks 16 and the narrow gauge tracks 18 leading to a car dumper, indicated generally at 47. In Figure 4, railroad cars to be thawed enter the chamber in the direction of the arrow, and after having been suitably heated, leave the chamber and proceed to the car dumper where the material is discharged therefrom. The broad gauge tracks 16 on the entering side of the chamber, that is, on the side of door 4 (door #1) are provided with a derail device 48, which prevents traffic on such tracks from entering the chamber when either door 4 or door 5 is down. There is also provided, on the entering side, a red and amber traffic signal 49 to indicate when the derailer is on the tracks in operative position and when it is off the tracks, respectively. On the exit side of the chamber, that is, just past door 5 (door #2), broad gauge tracks 16 are provided with a similar derailer 52 which operates simultaneously with derailer 48; on such exit side there is also placed a traffic signal 54 similar to signals 49, and acting simultaneously therewith. On the exit side there is also provided, adjacent the narrow gauge tracks 18, a trip arm 53 which is automatically positioned when derailers 48 and 52 are on tracks 16, to cut the power from pusher locomotive 19 should the locomotive attempt to pass such position to enter the thawing chamber. Also positioned on the exit side of the chamber within reach of the locomotive operator is a panel board 55 carrying a manually set timing device 56, a sequence start switch 57B, a sequence stop switch 57', emergency lower switch 58, and emergency stop switch 58A. The controls for the derailer circuit are located in derail panel board 59, likewise positioned on the exit side. The sequence start and sequence stop switches, as well as the emergency door and emergency stop switches, are duplicated on the entering side of the thawing chamber where the sequence start and stop switch is designated generally as 50 and the emergency lower and stop switch as 51. Sequence starting and stopping and emergency lowering and stopping may thus be carried out from either end of the thawing chamber.

The main portion of the controls for the thawing apparatus are contained in control room 89, shown at the right of the thawing chamber in Figure 4. Panel 61 contains controls for the hoisting devices for both doors as well as the furnace temperature control (Micromax) devices. Panels 62 contain the controls for the flame protective device of the heating means (Flame-otrols). Box 62a is a junction box, whereas box 62b contains the three temperature control relays 3—CR, 4—CR and 5—CR, subsequently to be described. Panels 63 contain the starting devices for the combustion blower fan motors 26a and panels 64 contain the controls for the motors 34 for the circulating fans. Also shown in the control room is switch 65 for the 230-volt D. C. circuit supplying power to the various starting and solenoid coils, switch 66 for the 110 A. C. signal circuit, and switch 67 for the 220-volt, three phase, 25-cycle A. C. circuit supplying the power for the hoist motors, combustion fan motors, and circulating fan motors.

The burners 23 of heating devices 21 are equipped with pilots burning by-product gas. Such gas is supplied through pipes 73a to the burners, and is controlled by solenoid-operated gas regulating valve 73b. Each burner 23 is also equipped with a combination valve, indicated generally at 68, consisting of a butterfly valve 69 in pipe 26b from the combustion blower to the burner, valve 70 in steam pipe 25, and valve 71 in oil supply pipe 24. All three portions of the combination valve are mechanically connected together by a suitable linkage (not shown) to insure the correct relationship between the air, steam, and oil supply at all times. Steam supply line 25 is also provided with a solenoid-operated valve 72 for each burner, and oil supply pipe 24 is provided with a solenoid-operated valve 72 for each burner, to enable the supply of steam and fuel oil to each burner to be automatically controlled by the circuit to be described.

Each combustion air blower 26 is provided with a pressure responsive means 74, located adjacent thereto in pipe 26b, means 74 functioning in a manner subsequently to be described. Each circulating fan 33 is provided, in the housing thereof, with a thermocouple 75 and a suction switch 76, the thermocouple functioning with the Micromax control to maintain the heated air delivered from the heating means with which it is associated at the correct temperature, and the suction switch operating to shut off its respective heating mechanism should failure occur in the circulating fan or its drive. The thawing chamber is also provided with a gas bleeder valve 77 indicated schematically in Figure 4, said valve 77 having a regulating damper operated by a pressure control regulating mechanism whereby valve 77 functions to relieve excessive pressure in the thawing chamber. A further switch panel 78 is arranged interiorly of the upper portion of the structure but outside the thawing chamber. Such panel carries a manually operated switch 79 for turning the oil supply on and off, a switch 80 operating the pilot flames for each burner, switches 81 operating each of the combustion blower motors 26a, and switches 82 for operating each of the recirculating fan motors 34.

The manner in which the previously described controls and protective devices for the thawing chamber and the associated means for moving cars into and out of such chamber operate will be more fully comprehended by consideration of the circuit shown in Figures 5a, 5b, 5c, 5d and 5e and by the following description thereof. Figures 5a, 5b, 5c, 5d and 5e, taken together, the wires at the bottom of Figures 5a, 5b and 5c being connected to the correspondingly designated wires at the top of Figures 5b, 5c and 5d, respectively, and the wires to the left of Figure 5d being connected to the correspondingly designated wires at the top of Figure 5e, constitute a single circuit diagram, as will be seen.

The electrical circuit connecting the door hoists, combustion fans, recirculating air fans, pilot flame ignition circuit, and the steam, gas, and oil solenoid control circuits, as well as a protective control circuit, is shown in the diagram shown in Figures 5a, 5b, 5c, 5d and 5e. The parts making up the main elements of each such circuit are grouped together. The source of power for the hoist and fan motors consist of a 230-volt D. C. supply attached to wires IL1 and IL2. Across such supply wires IL1 and IL2 is connected a protective control circuit, which prevents operation of the hoist motors and blower fans, and which will close all gas, oil, and steam solenoid-operated valves under certain conditions.

Such protective control circuit consists of overload relay contacts OLR (Figure 5c), voltage relay coil VRC, contacts UV1 (Figure 5e), contacts PR1, contacts OL5 and OL4, contacts PR2, and contacts OL2 and OL1. Contacts OLR are operated by the coil OLRC in the overload circuit, coil OLRC opening contacts OLR when too high a current flows through the coil. Relay contacts UV1, which make or break the circuit through wires 83 and 84, is in the control circuit for the derailing devices. Upon loss of voltage in the 18-volt derail circuit, due to fuse failure, relay coil UV1C is deenergized, thus breaking the connection between wires 83 and 84 and opening the circuit to the coil VRC.

Contact PR1 is operated by the pressure responsive means 74 located in the air duct from the #1 blower fan 26. This device is short-circuited by switch 85 mechanically connected to a push button on switch panel 63 used for starting the #1 blower fan. While the blower fan in the #1 unit is operating the contacts PR1 will remain closed. However, if the unit fails for such reason as fan shaft breakage or the failure of the fan to deliver air for any reason, contact PR1 will open the circuit to coil VRC.

Contacts OL5 and OL4 are overload contacts in the motor circuits (shown at the top of Figure 5$^d$) of the burner blower 26 of unit #1 and of the circulating fan 33 of unit #1, respectively, and contacts OL2 and OL1 are overload contacts in the motor circuits of the burner blower 26 of unit #2 and of the circulating fan 33 of unit #2, respectively. All of these overload contacts are normally closed, but will open on thermal overload to their associated motor. Contact PR2 is operated by the pressure switch 74 located in the air duct from the #2 blower fan 26, and is short-circuited by switch B, mechanically connected to a push button on switch panel 63, used for starting the #2 blower fan 26.

With normal starting, all the above contact devices in the protective control circuit are closed when the main power switches are closed except the switches PR1 and PR2. These are closed by the manual operation of the starting push buttons on panel 63 with the consequent closing of switches 85 and B, for the starting of the #1 and #2 blower fans 26 respectively. Both buttons are pushed together to start both fans at once and to energize coil VRC.

Energization of relay coil VRC closes contacts VR1, shown in the lower part of Figure 5$^c$, in the No. 1 door control circuit, permitting the closing of contactors for the lifting motors for both doors. Opening of contacts VR1, on the other hand, by deenergizing relay coil VRC, stops the operation of both doors. Energization of relay coil VRC also closes contacts VR2 in the combustion air fan control circuit, which when open prevent operation of the burner and blower fans, and closes contacts VR3, which allows opening of all solenoid-operated gas, oil, and steam valves, said valves being closed upon opening of contacts VR3.

Connected across supply lines IL1 and IL2 through contacts VR3 is a pilot flame ignition circuit. Such circuit consists of the pilot starting switch 80 connected in series with a circuit consisting of relay coils 3CRC and 4CRC connected in parallel. When switch 80 is closed, relay coils 3CRC and 4CRC are energized; a contact 3CR operated by relay coil 3CRC opens the circuit to all solenoid operated oil and steam valves 72 and 73 respectively, thereby insuring that such valves remain shut. Contact 3CR1 at the same time closes a circuit to the solenoid-operated gas valves 73$^b$. These valves admit gas to the pilot flame orifice. Energization of relay coil 4CRC closes contacts (not shown) in the power supply of an ignition transformer (not shown) thus causing a spark to jump across the gas located in the pilot flame orifice. The pilot flame will ignite, and when the flame is established, power will flow through the flame path to a relay (not shown) which closes the circuit across lines 86 and 87 (Figure 5$^d$) thus energizing and maintaining a circuit to the relay coil 5CRC. Such burner igniting mechanism is part of a standard unit for such purpose, such as the "Flame-otrol." Contacts 5CR, closed by energization of relay coil 5CRC, will close in the circuit to the "pilot on" light 88; relay coil 5CRC will be energized, and contacts 5CR will stay closed as long as the pilot light is on. Upon releasing pilot switch 80, relays 3CRC and 4CRC will be deenergized, thus breaking the circuit by opening contacts 3CR1 and establishing a circuit by closing contacts 3CR. Contact 5CR1, operated by relay coil 5CRC, will close and maintain power across the solenoid-operated gas valves 73$^b$, and power through contacts 3CR, now closed will open solenoid-operated steam and oil valves 73 and 72 respectively, thus causing the atomizing system to be made ready for the admission of oil.

In making the thawing apparatus of the present invention ready for operation, it is necessary to close all main power and control switches, open all manually operated valves, and then start the #1 and #2 blower fans by energizing coils 2MC and 5MC and initiate the pilot flame. Such procedure must be performed each time the plant is made ready for a thawing run. The apparatus is now ready for the normal sequence start and stop operation for the thawing of cars.

When the operator is ready to start a thawing cycle, the sequence switch 57 (Figure 5$^e$) is closed. This switch operates into the derailing circuit, shown in that figure, through wires NW1 and RW1 and applies the derail to the track rails. The derailing device is a standard Hays derailer, made by the Union Switch and Signal Company, modified only by the addition of relays 200, 202, and 204, subsequently to be explained. In Figure 5$^e$, the circuit is shown in that condition wherein the derails are off the rails. The derailing circuit is supplied with current from an 18-volt D. C. supply connected to lead B18 and C18.

Closure of switch 57 by depressing the plunger thereof, places power from the 18-volt power supply on the wires NW1 and LW1 and breaks the circuit to wire RW1. LW1 is connected to locking relay coils L, of which two are shown in series (one set of relays L, N, and R being associated with the derailing device on one side of the ore thawing building, and the other set being associated with the derailing device on the other side of the building) to accomplish unlocking of the derailers in their inoperative position. Current in wire NW1 energizes relay coils N to open a valve (not shown) in a compressed air line to move the derailing devices and the trip arm for the power supply to locomotive 19 into operative position, that is, onto the rails. After the derails are in place on the rail, the locking relays L are again energized by means of switches 89 and 90, which are mechanically connected to the respective derailers in such manner that their rotary contactors (not shown) connect contacts Nos. 110 and 112 to contacts 114 and 116, respectively, in switch 89, and connect contacts Nos. 118 and 120 to contacts 122 and 124, respectively, of switch 90 when the derails are in operative position. Thus the derails are now locked in position.

When switches 89 and 90 are thus shifted, they deenergize relay 3WPR by disconnecting it from the 18-volt circuit. Thereupon the contact 91 of relay 3WPR becomes operative to energize the coil of relay 204 with 18-volt current. Closing of relay 204 closes its contacts 92 in the 250-volt circuit from wires 93 and 94. Power thus flows to limit switch contacts LS—4—1 and LS—4—2 (Figure 5$^d$) and thence to the sequence stop switch 57B and to relay coil LRC, thus energizing such coil.

The relay 204 remaining closed, it becomes necessary to release the circuit set up. This is accomplished by the opening of cam-type limit switches LS—4—1 and LS—4—2 immediately after the doors start lowering, such lowering being initiated for both doors by the coil of the LR relay, as will subsequently be explained.

In the derail circuit shown in Figure 5$^e$ there is also a 110-volt lighting circuit for the operation of the signal lights marked Y (yellow) and R (red). The wires for such 110-volt circuit are marked B110 and C110. Wire B110 leads to a switch operated by relay 1—2HR, the coil of such relay being connected, as shown, to a switch 91 operated by relay 3WPR, which in turn is operated by the switches 89 and 90 which have, as before explained, rotary contactors mechanically connected to the derails. The rotary contactors are so constructed that when the derails are off the rails the coil of relay 3WPR is energized, thus closing the switch associated therewith which controls relay 1—2HR, and thereby energizing such latter relay, and that when the derails are on the rails relays 3WPR and 1—2HR are deenergized. It is therefore obvious that, when the derails are off the rails, current will flow in wires RW and LW, thus lighting the lights Y, and that when the derails are in place on the rails current will flow in wires RW and NW, thus lighting the lights R.

The two relays marked 200 and 202 are wired into the derail circuit so that when the doors approach the wide open position, and the chamber is thus ready for removal of the thawed cars and/or the introduction of new unthawed cars, the derails are automatically removed from the rails. The circuit to remove the derails in such manner is from wire 96 to limit switches LS1—1 and LS1—2 (Figure 5e) through the interlock of the relay 202 to the coil of relay 200. Breaking of the circuit through these limit switches causes deenergization of the coils of relays 200 and 202, and thus removal of the derails from the tracks.

Returning now to the energization of the relay coil LRC by the pressing of the sequence start switch 57 and the operation of the derails as described to operative position on the rails and their being locked there, the operation of the door closing circuits, and their construction will now be explained. Since each door circuit is a replica of the other, only the top circuit, for door #1, will be described.

There are three contacts that close when the relay coil LRC is energized. One of these contacts, LR3 (Figure 5b), in series with the contacts 11M3 and 21M3 in parallel, will connect the coil LRC to wires 94 and 97, thus allowing the operator to let the push button switch 57 spring back to its normally open position. Coil LRC will still remain energized through wire IL2, emergency stop switch 58A (middle of Figure 5a), contacts LR3 in series with contacts 11M3 and 21M3 in parallel, and the sequence stop push button 57A; negative power for the coil LRC being obtained through the contact VR1 and the wire 96.

Another contact LR2, operated by coil LRC, will connect wire 98 to wire 99 (Figure 5a) operating a latch-type relay coil LTRC (the operation of this coil will be explained later), and the relay coil 11DBC. Contact 11DB1, operated by relay 11DBC, will connect wire 99 to wire 100 (bottom of Figure 5a), thus energizing coils 11MC and 12DBC, connected in parallel. Coils 11MC and 12DBC are connected to line IL1 by the closing of the 11DB1 contact, wire 101, closed contact 11FLD, wire 96, and contact VR1. The coil 12CRC is connected to line IL1 through contact VR1, wire 96, contact 11FLD, and contact 11SDD. Operation of coil 12CRC closes a contact 12CR1 in the circuit to coil 14AC. Coil 11CRC is also connected through a contact 11SDU to wire 102.

For the main motor circuit to #1 door for lowering, relay contacts 11KO, 11M, 14A, 12DB, 11A, 12A, 13A must close. The main power flow is from IL2 through relay switch 11KS, overload relay 12OLC', contacts 11KO, and resistance IR20. Here the power divides and flows two ways: the first path is from point 11A1 through the armature P to point 11A2 through resistance IR6 to contacts 12DB, when closed, to point 150. The second path is from 11A1 through the field Q. At point 150 the two circuits combine and the power flow is through the series brake R to wire 11B1. The current flows through relay contacts 14A, 13A, 12A, 11A, contact 11M, overload relay 11OLC', and relay switch 11KS' to IL1, which is the opposite side of the line. Full voltage, somewhat limited by the resistance IR20, is thus placed on the motor armature and the field in parallel. The power flowing through these two paths combine, and all power available combine to release the electrically operated brake R. This combination of circuits and resistance allows the door to lower at a safe speed regardless of the overhauling weight of the door.

As the door lowers to within six inches of the bottom limit of travel, 11SDD, which is the slowdown limit switch in the lowering direction, will open, deenergizing coil 12CRC and thus opening 14A contactor and inserting resistor IR6 in the armature circuit of the motor. This will cause the door to slow down. As the door settles to the lower limit of travel, the final limit switch 11FLD will open, deenergizing coils 11DBC, 12DBC and 11MC. Deenergizing coil 11MC in turn deenergizes coils 11KOC, 11AC, 12AC and 13AC, thus removing all power from the main motor circuit and releasing the brake. This operation will stop the door and apply the brake. The brake bands are applied mechanically by means of heavy springs, and will hold the door in any position upon failure or removal of power.

11FLD is a traveling nut type limit switch geared to the main hoist drive. All other limit switches such as 11SDD, 11SDU, LS3—1, etc., are a part of a 10-point cam type limit switch 95, indicated in Figure 4, for door #1, driven by means of a reduction gear coupled directly to the motor shaft. Door #2 is lowered and raised in the same manner, by the same type of mechanism and at the same time as door No. 1, whose operation has been described. The circuit for the #2 door hoist motor is shown in Figure 5b, where P', Q', and R' represent the armature, field, and brake for such motor, respectively. The parts of such circuit which correspond with those for the #1 door motor are similarly designated except for a change of the first numeral from 1 to 2.

During the time interval in which the doors are lowering, other devices are started and entered into operation. Thus energization of relay coil LRC to start the sequence of control for the door lowering will close a contact LR2 in the relay closing coil LTRC circuit of a latch type relay LTRC. This will close a contact LTR2 connecting wire IL2 through the LTR2 contact to wire 103 which connects to LS6—1 and LS6—2. As the door approaches the half-way position, lowering, LS6—1 will close to wire 104, through the test push button S to wire 105 to the coil 4MC operating the across-the-line starter coil for starting the #1 recirculating air fan 33. After a fifteen-second time interval and as the door approaches within six inches of the bottom limit of travel, switch LS6—2 will close to wire 106 through the test push button T to wire 107, to the coil 1MC which will operate the across-the-line starter for the #2 recirculating air fan 33.

As the door lowers to within two or three inches of the bottom, limit switches LS3—1 and LS3—2

(Figure 5ᵈ) will close from wire IL2 to the fan suction switches 76 to the manually operated "off-on" switch U, the oil valve solenoids 72, and the CRX relay.

The fan suction switches 76 are located in the air ducts for the recirculating fans, and each suction switch will close in turn as the recirculating air fans start. If for any reason, such as breaking of belts to fans or mechanical breaking of shafts, the fans fail, the opening of suction switches 76 will release the oil solenoids 72 and close the valves, so as to prevent obtaining a combustible mixture in the heating furnaces or in the thawing chamber.

The relay coil CRXC, upon energization, will close a contact (not shown) in a circuit in the temperature controller, actuating a timing circuit (not shown) for the initial thawing cycle. This timing circuit is controlled from the manually preset, electrically operated time clock 56.

Also, the temperature controller will, at this time, start positioning the three-way mixing valve 68, which has been previously described. This valve admits the proper mixture of air, oil, and steam to the main burner for maintaining the initial thawing cycle.

To sum up the above procedure, the ore thawing chamber is now in full operation, with both burners delivering the high heat cycle of, for example, approximately 750° for any time period desired; for instance, from 5 to 30 minutes, depending upon the cycle for which the time clock is manually preset. After this high temperature heating period is completed, the clock resets the temperature recorder to, for example, a 250° cycle of heating for any period that will not damage the ore cars in the chamber. Opening the doors will, by the mechanism described, stop any heat cycle and all of the equipment necessary to maintain the heat cycle.

After completion of a thaw cycle, the operator will depress the sequence stop push button 58B (Figure 5ᵃ). This will energize the relay coil HRC (Figure 5ᵇ). The circuit for this relay is from wire IL2 through the stop push buttons 58A and 58B, through contacts 14A1, 11A1, 21A1, 24A1, push button 58C, to the relay coil HRC, to wire 96, through VR1 contacts to wire IL1, which is the opposite side of the line. Operation of coil HRC will energize coil LTRC to close contacts LTR1 and LTR2, latching the LTR switch mechanism to the opposite setting. This will immediately deenergize the coils 4MC and 1MC of the two across-the-line starters operating the recircultaing air fan starters. Both fans will thus cease operating.

Closing of the HR contacts will also energize the coils 11HC, 11CRC, 11MC, 12DBC, 14AC, 11AC, 12AC, and 13AC. Closing of the coils 11AC, 12AC, and 13AC will be prevented from operating by restraining coils, the function of which will be explained later.

Referring to the main motor circuit for #1 door motor, to initiate the hoisting motion relay coils 11HC and 11MC must be energized, contacts 11H and 11M must be closed, contacts 11DB and 12DB must be open, and relay coils 11AC, 12AC, 13AC and 14AC ready to operate. The resulting circuit for the initial start will be from line IL2 through 11KS, 12OLC', 11H, 1R6, to armature wire 11A1, to the field Q, to series brake R, to wire 11B1 to resistors 1R4, 1R3, and 1R1, to 11M contactor, coil 11OLC', switch 11KS', to IL1.

The #1 door hoist motor will start to hoist the door slowly. Contactor 11A will close because coil 11AC is energized from line IL1 through contacts 11M2 and 11DB3, through relay coils 11AC, 12AC and 13AC in parallel (coils 12AC and 13AC do not close because of armature current circulating through their restraining coils HC12AC and HC13AC), through contacts 12DB2, 12DB1, 11CR, LR1, HR3, 24A1, 21A1, 11A1 and 14A1 and push buttons 58B and 58A to line IL2. Closing of 11A contactor short-circuits 1R1 resistor. The motor then speeds up, hoisting the door faster. When the starting current peak for this step on the motor dies down, restraining coil HC12AC will allow 12A contactor to close, thus short-circuiting resistance 1R3. The motor will speed up further, hoisting the door faster. When this current peak dies down in restraining coil HC13AC, contactor 13A will close, short-circuiting resistance 1R4. The deenergization of coil HC13AC will also close contact 13A1 to energize relay coil 14AC which closes 14A contactor and short-circuits resistor 1R6, thus allowing full voltage across the motor with corresponding full load current, and, as as result, full speed hoisting of the door.

When the door has risen about two or three inches, limit switches LS3—1 and LS3—2 will open, removing power from the oil valve operating solenoids 72 which will close; the opening of the CRX relay opening in the temperature controller will position the three-way mixing valve, closing the supply of oil and air completely, and closing down the atomizing steam to a pressure such as 10 p. s. i. value for purging purposes, such steam pressure being maintained at this value constantly during the time the doors are open. When the door lifts to approximately 36 inches from the end of its travel at the top, the derails will be removed from the rails. This will operate the traffic lights to the yellow position, and will admit traffic through the ore thawing chamber. Within 8 inches of the end of travel upward limit switch 11SDU (Figure 5ᵃ) will open, removing power from the relay coil 11CRC. The opening of contact 11CR will open contacts 11A, 12A, 13A, and 14A, and the door hoist mechanism will slow down. When the door has reached the top limit of its travel, limit switch 11FLU (Figure 5ᵃ) will open, deenergizing coils 11HC, 11CRC, 11MC, and 12DBC. Relay 12DBC is a spring closed contactor which is held open electrically and closed mechanically. The deenergizing of coils 11HC, 11CRC, and 11MC will disconnect all power from the motor circuit, and will allow the brake to apply, thus stopping the door and holding it in the wide open position. At such wide open position of the doors, the oil solenoids 72 will be closed, the three-way mixing valve 68 will be closed, the recirculating air fans will be stopped, the derails will be in inoperative position, and the traffic lights will be set to allow traffic to proceed through the thawing chamber. Thus the apparatus is then in readiness for the placement of one or more loaded cars within it, and for the subsequent initiation of another thawing cycle.

When using the particular apparatus above described, in the thawing of two ninety-ton ore cars at one time, it has been found that, with heating devices 21 with a rated capacity of 10 million B. t. u. per hour each, a ten-minute preliminary heating period at 500–700° F., followed by a cut-back to soaking at 200–250° F. for from 5 to 20 minutes is sufficient to thaw most if not all cars encountered during ordinary winter weather, to an extent sufficient to allow their being emptied in a satisfactory manner by a car dumper which inverts the cars. It is usually necessary to thaw the material to a depth of only about one inch from the car walls and bottom to accomplish the desired freeing of the material from the car. Under exceptionally severe freezing conditions it may be necessary to increase either the length of the preliminary high temperature heating period or the soaking period, or both, and for light freezing conditions either or both heating periods may be shortened. Within the scope of the method of the present invention there may be employed, therefore, a preliminary heating at from 500° to 750° F. for from 5 to 15 minutes, and a subsequent heating at from 200° to 250° F. for from 5 to 20 minutes.

Use of the device of the present invention has been found to overcome a serious bottleneck in the handling of ore, limestone, and coke in the winter time. In addition to the speed and certainty with which such materials may now be dumped after the thawing by such device, it has been found that no injury results to the cars by reason of such heating. The metal work, paint, rubber air hoses, and rubber hose gaskets show no deterioration resulting from such treatment, which is in marked contrast to the damage caused by the previous use of wood fires or gas jets in thawing the cars.

Whereas a particular embodiment of the apparatus has been described for purposes of illustration, it is obvious that numerous variations within the teaching of the invention are obvious to one skilled in the art. The scope of the invention is therefore defined by the appended claims. This application is a division of application Serial No. 574,436, filed January 24, 1945.

We claim:

1. Apparatus for preparing for dumping a railroad car having frozen material therein, which comprises a thawing chamber having an inner space of a size at least sufficient to receive the car, openings in opposite walls of the chamber of sufficient size to allow passage of the car, railroad tracks running through the chamber and the openings therein to allow passage of a car therethrough, derailing devices positioned for operation on the tracks outside each side of the chamber, means for moving a car on said tracks into and out of the chamber, retractable doors for the openings in the chamber, means for opening and closing the doors, means for heating the car in the chamber by subjecting it to air blasts heated to controlled temperatures, and means responsive to the position of at least one door to place the derailing devices on the tracks and to initiate the heating means when the door approaches the closed position and for stopping the operation of the heating means when the door begins to open and for removing the derailing devices from the tracks when the door approaches wide open position.

2. Apparatus for preparing for dumping a railroad car having frozen material therein, which comprises a thawing chamber having an inner space of a size at least sufficient to receive the car, openings in opposite walls of the chamber of sufficient size to allow passage of the car, railroad tracks running through the chamber and the openings therein to support the car and to allow passage of the car therethrough, a parallel set of tracks likewise running through the chamber and the openings in the walls thereof, an electric pusher locomotive on the second set of tracks for pushing at least one car into and out of the chamber, derailing devices positioned for operation on the car supporting tracks outside each side of the chamber, a retractable arm positioned on the entry side of the chamber in operative relation to a power switch on the electric locomotive to trip said switch and cut off power to the locomotive if the locomotive passes said arm when the latter is in outwardly extended position, retractable doors for the openings in the chamber, means for opening and closing the doors, means for heating the car in the chamber by subjecting it to air blasts heated to controlled temperatures, and means responsive to the position of at least one door to place the derailing devices on the car supporting tracks, to place the trip arm operating the locomotive switch in operative position and to initiate the heating means when the door approaches the closed position, and means for stopping the operation of the heating means when the door begins to open and for removing the derailing devices from the car supporting tracks and placing the trip arm for operating the locomotive switch in inoperative position when the door approaches wide open position.

3. Apparatus for preparing for dumping a container having frozen material therein, which comprises a heating chamber having an inner space of a size at least sufficient to receive the container, said chamber having at least one opening therein allowing passage of the container, a retractable door for said opening, means for opening and closing said door to allow entrance and exit of the container, means for subjecting the container in the chamber to hot air blasts, said last named means comprising a combustion chamber, a burner directing combustion flames into the combustion chamber, a chamber for mixing the products of combustion and air and having communication with the combustion chamber, a manifold connected to the mixing chamber, means forcing heated air from the mixing chamber into the manifold, a plurality of conduits connected to the manifold, the distant ends of the conduits being spaced at substantially equal distances along one or more of the surfaces of the container, nozzles on the distant ends of the conduits directed toward the container to cover a major portion thereof with the hot air blasts, and return air ducts leading from the inner space of the heating chamber to the mixing chamber.

4. Apparatus for preparing for dumping a container having frozen material therein, which comprises a heating chamber having an inner space of a size at least sufficient to receive the container, means for subjecting the container in the chamber to hot air blasts, said last named means comprising a combustion chamber, an oil burner directing a flame into the combustion chamber, means conducting the products of combustion into the heating chamber and directing them against the container therein, a motor driven fan for forcing the products of combustion through the last named means, an oil supply pipe for the burner, a pipe supplying combustion air for the burner, a pipe supplying steam under pressure to the burner to atomize the oil, a gas pilot for the burner, solenoid-operated valves in the oil supply pipe, the combustion air pipe, and the steam supply pipe, and a safety circuit connected to the solenoids of the aforementioned valves, said safety circuit comprising means operating said solenoids upon loss of voltage to the motor driving the fan to close the valves and thus discontinue operation of the heating means.

MARY ALICE FORSYTHE,
*Executrix of the Estate of John W. Forsythe, Deceased.*

EDWARD J. SMOTZER.

REFERENCES CITED

The following references are of record in the file of this patent:

UNITED STATES PATENTS

| Number | Name | Date |
|---|---|---|
| 750,588 | Buck | Jan. 26, 1904 |
| 1,277,996 | Newhall | Sept. 3, 1918 |
| 1,629,116 | Muehlenbeck | May 17, 1927 |
| 1,638,811 | Maehler et al. | Aug. 9, 1927 |
| 1,638,812 | Maehler et al. | Aug. 9, 1927 |
| 1,700,994 | Buck | Feb. 5, 1929 |
| 1,746,799 | Schramm | Feb. 11, 1930 |
| 1,968,775 | Robertson | July 31, 1934 |
| 2,110,209 | Engels | Mar. 8, 1938 |
| 2,355,814 | Mayer | Aug. 15, 1944 |
| 2,385,962 | Barnett | Oct. 2, 1945 |

Certificate of Correction

Patent No. 2,507,775

May 16, 1950

JOHN W. FORSYTHE, DECEASED, ET AL.

It is hereby certified that errors appear in the printed specification of the above numbered patent requiring correction as follows:

Column 5, line 11, for the reference numeral "57B" read *57*; line 12, for "57'" read *57B*;

and that the said Letters Patent should be read with these corrections therein that the same may conform to the record of the case in the Patent Office.

Signed and sealed this 5th day of September, A. D. 1950.

[SEAL]

THOMAS F. MURPHY,
*Assistant Commissioner of Patents.*